Patented Aug. 6, 1940

2,210,704

UNITED STATES PATENT OFFICE 2,210,704

INSULATING MATERIAL

Arthur L. Brown, Pittsburgh, and Lawrence R. Hill, Edgewood, Pa., assignors to Westinghouse Electric & Manufacturing Company, East Pittsburgh, Pa., a corporation of Pennsylvania No Drawing. Application May 6, 1939, Serial No. 272,139

5 Claims. (Cl. 154—2.6)

This invention relates to insulating material and particularly to sheet and molded insulating material of the type utilized in the electrical industry.

In the electrical industry different types of sheet insulating materials have been employed in the manufacture of electrical apparatus. Attempts have been made to utilize mica flakes bonded into suitable form, but these have not always been satisfactory, especially where the insulating material is machine built because the resulting sheet or plate lacks uniformity, mechanical strength and is difficult to handle without damaging it.

An object of this invention is to provide an insulating material formed from mica flakes and which is mechanically strong, resistant to flaking and can be milled without fracture.

Other objects of this invention will become apparent from the following description and the appended claims.

In the making of electrical insulating material, mica flakes are desirable because of their high dielectric strength. In accordance with this invention mica flakes of a size commercially available are utilized and formed into sheet or plate form by substantially evenly distributing them over a traveling web in any of the known methods to give a predetermined thickness depending upon the size of the finish sheet or plate.

In order to utilize the mica flakes in the industry, a bond must be provided for securing the mica flakes in the desired form. This bond is applied to the mica flakes by slowly dripping the bond in a liquid form onto the distributed flakes after which they are subjected to sufficient heat to drive off the solvent of the bond and give a sheet material which can be physically handled.

In accordance with this invention, in order to give the desired insulating material, a bond comprising shellac, ethyl cellulose and chlorinated diphenyl commonly known as "Aroclor" form the body or solids thereof while a suitable solvent such as alcohol is employed to render the bond liquid for applying it to the distributed flakes. Shellac by itself is unsatisfactory for this purpose, since in practice it is found that the sheets of the flakes coated with the shellac from which the solvent is dried cannot be physically handled during the processing without damaging the sheet.

In order to provide a bond having good adhesive with the mica flakes, ethyl cellulose in an amount sufficient to form from 5% to 20% of the solids of the bond is employed in conjunction with the shellac. The ethyl cellulose has a melting point of about 200 to 210° C., but is plastic at a somewhat lower temperature. Even though the melting point of the ethyl cellulose is high, it is found that where it is employed within the ranges given it lowers the softening point of the shellac to render it more suitable for this application. If more than 20% of the ethyl cellulose is employed in the bond, it is found that it is not compatible with the shellac bond. In all cases the ethyl cellulose tends to so prohibit polymerization of the shellac as to permit handling and working of the mica flakes carrying the bond prior to the polymerization thereof. The ethyl cellulose when employed in the bond in the ranges given, definitely improves the adhesion of the bond and prevents flaking off of the mica flakes during the processing of the insulating material.

Since the mica flake sheet material is often physically handled prior to the polymerization of the bond, even to the extent of causing bends and sharp angles in the material, it is necessary to improve the slip characteristics of the shellac and ethyl cellulose. In practice it is found that by including from 1 to 10% of chlorinated diphenyl in the bond that the resulting bond has the characteristic of permitting the mica flakes coated with the bond to slip parallel with respect to the surface of the insulating material as the sheet is bent instead of flaking off. If more than 10% of the chlorinated diphenyl is added to the bond, it impairs the adhesion characteristics thereof. The chlorinated diphenyl also has the characteristic of retarding polymerization of the shellac and cooperates with the ethyl cellulose in the bond to permit handling and molding of the insulating material prior to polymerization.

In order to apply the solids of the bond to the mica flakes distributed in sheet or plate form the solids are dissolved in alcohol. In a preferred liquid bond the solids comprising shellac, ethyl cellulose and chlorinated diphenyl form from 18 to 25% by weight of the liquid bond with the balance alcohol. In this form it can easily be applied as by dripping it onto the distributed mica flakes where it flows over and between the flakes to coat them. After the liquid bond has been applied to the mica flakes, the material carrying the bond is passed through a furnace and subjected to a temperature of about 110° C. for a period of time of about 10 minutes to drive off the solvent of the bond. In this form the bond freed from the solvent has the characteristics of good adhesion and sufficient slippage for permitting further fabrication of the mica flakes carrying the bond.

The sheet or plate material formed from mica flakes carrying the bond which is free of the solvent can be cut into predetermined shapes prior to polymerizing the bond, or because of the flexible nature of the bond, can be formed into intricate shapes for molding into desired forms. Where it is desired to cut the insulating material into sheets or different forms, it is found that because of the inclusion of the aroclor in the bond that the sheet can be sanded without damage to the insulating material thereof after which it can be milled to form.

In order to effect the polymerization of the bond to render the insulating material firm and resistant to distortion, the insulating material either in the sheet form or in intricate designs is subjected to a temperature ranging from 140 to 165° C., for a predetermined period of time depending upon the ethyl cellulose and aroclor contents of the bond, to polymerize the shellac.

In practice it is found that with the larger content of the ethyl cellulose and chlorinated diphenyl present in the bond that a longer period of time is necessary in effecting the polymerization of the shellac. In all cases where the ethyl cellulose and chlorinated diphenyl are present in the bond and the insulating material is subjected to a polymerizing treatment, the bond is perfectly homogenous. Although the bond is homogeneous, by chemical analysis it may be shown that it is composed of shellac, ethyl cellulose and chlorinated diphenyl.

In making a sheet of insulating material embodying this invention, the preferred bond referred to hereinbefore effectively prevents the mica flakes from flaking off the sheet during the processing thereof, and effectively prevents the forming of low spots in the sheet. The bond is also so adhesive that as the sheets are physically handled during the processing thereof, flaking is not encountered. Further slippage is permitted between the mica flakes without danger of breaking the insulating material even when bent back upon itself. Further the characteristics of the resulting sheet are such that it does not swell when heated but instead remains firm and homogeneous. When cold, the insulating material is hard and possesses high dielectric and mechanical strength.

Although this invention has been described with reference to a particular embodiment thereof, it is, of course, not to be limited thereto except insofar as is necessitated by the prior art and the scope of the appended claims.

We claim as our invention:

1. As an insulating material, mica flakes bonded together with less than 10% of an adhesive comprising an intimate mixture of from 5% to 20% of ethyl cellulose, from 1% to 10% of chlorinated diphenyl and the balance shellac.

2. As an insulating material, a sheet formed from mica flakes and an adhesive comprising from 18 to 25% of solids with the balance a solvent for the solids, the solids comprising from 5% to 20% of ethyl cellulose, from 1% to 10% of chlorinated diphenyl and the balance shellac.

3. As an insulating material, a sheet formed from mica flakes and an adhesive comprising from 18 to 25% of solid adhesive materials consisting of from 5% to 25% of ethyl cellulose, from 1% to 10% of chlorinated diphenyl with the balance shellac and from 82% to 75% of a solvent for the solids.

4. An insulating sheet material comprising a plurality of mica flakes substantially evenly distributed to form a sheet of predetermined thickness and size and a bond for sealing the mica flakes in their distributed position and to seal them into a strong unitary body, said bond having been formed under heat from an alcohol solution containing from 18 to 25% of solids consisting of from 5% to 20% of ethyl cellulose, from 1% to 10% of chlorinated diphenyl and the balance shellac.

5. As an insulating material, a sheet formed from mica flakes and an adhesive comprising an alcohol solution containing about 25% of adhesive solids consisting of about 80% of shellac, about 15% of ethyl cellulose and about 5% of chlorinated diphenyl.

ARTHUR L. BROWN.
LAWRENCE R. HILL.